United States Patent [19]

Speckhart et al.

[11] Patent Number: 5,154,275
[45] Date of Patent: Oct. 13, 1992

[54] APPARATUS FOR CONVEYING

[75] Inventors: Bernard Speckhart, Short Hills; Paul M. Berson, Mountain Lakes; Garri Akopnik, Newark, all of N.J.

[73] Assignee: White Conveyors, Inc., Kenilworth, N.J.

[21] Appl. No.: 643,776

[22] Filed: Jan. 22, 1991

[51] Int. Cl.⁵ .............................................. B65G 47/24
[52] U.S. Cl. ................................ 198/416; 198/465.4; 198/680; 198/666; 198/670
[58] Field of Search ............... 198/465.4, 657, 666, 198/670, 662, 663, 673, 680, 416

[56] References Cited

U.S. PATENT DOCUMENTS

| | | | |
|---|---|---|---|
| Re. 24,961 | 4/1961 | Curtis | 198/465.4 X |
| 421,999 | 2/1890 | Williams | 198/673 |
| 1,861,600 | 6/1932 | Harrison | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,599,615 | 6/1952 | Dahlberg | 198/673 X |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,899,072 | 8/1959 | Weiss | 211/1.5 |
| 2,918,164 | 12/1959 | Austin et al. | 198/177 |
| 2,947,407 | 8/1960 | Wood | 198/66 |
| 2,952,351 | 9/1960 | Stone | 198/680 X |
| 2,998,136 | 8/1961 | Gerisch | 209/122 |
| 3,113,659 | 12/1963 | Oda et al. | 198/25 |
| 3,124,236 | 3/1964 | Gerisch | 198/169 |
| 3,148,765 | 9/1964 | Weiss et al. | |
| 3,151,730 | 10/1964 | Buenten | 198/38 |
| 3,164,245 | 1/1965 | Juengel | 198/129 |
| 3,171,536 | 3/1965 | Johnson | 198/465.4 |
| 3,178,012 | 4/1965 | Weiss et al. | |
| 3,184,042 | 5/1965 | Rutkovsky et al. | 198/177 |
| 3,194,383 | 7/1965 | Kuwertz | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,581,887 | 6/1971 | Radutsky et al. | 209/73 |
| 3,622,000 | 11/1971 | McClenny | 209/121 |
| 3,684,078 | 8/1972 | Nielsen | 198/680 X |
| 3,707,925 | 1/1973 | Byrnes, Sr. | 198/465.4 X |
| 3,786,911 | 1/1974 | Milazzo | 198/219 |
| 3,917,112 | 11/1975 | Willis et al. | 221/1 |
| 3,942,340 | 3/1976 | Kirkby | 68/3 R |
| 3,961,699 | 6/1976 | Hirsch | 198/26 |
| 4,018,327 | 4/1977 | Goodman et al. | 198/723 |
| 4,027,598 | 6/1977 | Swilley | 104/162 |
| 4,036,365 | 7/1977 | Rosenfeld | 209/73 |
| 4,180,152 | 12/1979 | Sefcik | 198/680 X |
| 4,239,435 | 12/1980 | Weiss et al. | 414/136 |
| 4,875,416 | 10/1989 | Duce | 198/465.4 X |
| 4,943,198 | 7/1990 | McCabe | 414/13 |
| 4,977,996 | 12/1990 | Duce | 198/465.4 X |
| 5,000,309 | 3/1991 | Dooley | 198/680 |

FOREIGN PATENT DOCUMENTS

| | | | |
|---|---|---|---|
| 334127 | 7/1933 | Canada | 203/17 |
| 690778 | 7/1964 | Canada | 186/11 |
| 726529 | 1/1966 | Canada | 198/22 |
| 1018472 | 10/1977 | Canada | 203/18 |
| 1018931 | 10/1977 | Canada | 203/18 |
| 1140139 | 11/1962 | Fed. Rep. of Germany | |

OTHER PUBLICATIONS

Master-Veyor brochure, published by Speed Check Conveyor Co. Inc., Decatur, GA, pp. 1–4 (no date).
Sorting Carousel brochure, published by Dunnewolt U.S.A. Inc., Dallas, TX, pp. 1–4 (no date).
My-T-Veyor brochure, Model No. 830, published by My-T-Veyor, Oxford, MI, pp. 1–3 (no date).
Sort-O-Veyor brochure, published by Speed Check Coneyor Co. Inc., Decatur, GA, pp. 1–4 (no date).
Quick Assembly brochure, published by Natmar, Inc., Cincinatti, OH pp. 1–2 (no date).
Controlling Hospital Garments, Wim Giezeman, Textile Rental, Jun. 1982, pp. 34–36, 38.

Primary Examiner—D. Glenn Dayoan
Attorney, Agent, or Firm—Kenyon & Kenyon

[57] ABSTRACT

An apparatus for conveying articles supported on hooked members has a conveying shaft including a helical groove formed within the shaft. The helical groove is adapted to receive the hooked members and to convey the hooked members upon rotation of the shaft. A helical member is coupled on one end to the conveying shaft, and is adapted to receive the hooked members from the conveying shaft and to convey the hooked members upon rotation thereof. The helical member is supported within a support tube which includes an entrance portion formed on the end adjacent to the conveying shaft. The entrance portion is shaped to rotate the hooked members from a first position into a second position by contact therewith, upon the hooked members being conveyed through the entrance portion by the helical member. A slot is formed within the support tube and is adapted to receive the hooked member from the entrance portion. The slot maintains the hooked members in the second position upon being conveyed by the helical member.

25 Claims, 3 Drawing Sheets

APPARATUS FOR CONVEYING

FIELD OF THE INVENTION

The present invention relates to apparatus and methods for conveying articles and, in particular, to apparatus and methods for conveying articles supported on hooked members.

BACKGROUND INFORMATION

Methods and apparatus for conveying articles and, in particular, articles supported on hooked members are used in various industries. For example, hooked members are frequently used to convey articles on an assembly line. The hooked members are each adapted to support an article and to hang from a conveying line. The articles are then moved along the conveying line, and either used or worked on in the assembly line.

Once each hooked member is placed on the conveying line, it is typically oriented in a fixed position. Since the hooked members and, thus, the articles are usually placed immediately next to each other on the conveying line in order to maximize the usage of space, it is typically not possible for an operator to view the sides of the articles facing each other. It is also typically not possible to rotate the hooked members or the articles relative to the conveying line while they are being conveyed, if necessary, for example, to view a normally hidden surface on an article. Typically, the manner in which the hooked members are seated on the conveying line prevents the hooked members and/or the articles from being rotated from one position into another relative to the conveying line while being conveyed.

In laundry and dry cleaning facilities, the articles, which are typically garments, are placed on hooked members, typically hangers, and the hangers are loaded onto a conveyor. In larger laundry and dry cleaning facilities, the garments are loaded onto a sorting conveyor in an unsorted order or sequence. There are several drop-off stations located at various points along the sorting conveyor. The garments are sorted by moving the sorting conveyor and unloading each garment into a respective drop-off station in a predetermined order. The sorted garments located in one or more drop-off stations are then loaded into trucks for delivery to the customers.

In order to sort the garments on the sorting conveyor, it is necessary to first identify each garment in the unsorted sequence of garments. With known conveying and sorting apparatus, however, it has been difficult to efficiently collect identifying information for each garment upon loading the garment onto a sorting conveyor, so that the garments can, in turn, be efficiently sorted into the drop-off stations.

Each garment typically includes a label displaying the necessary identifying information. If the garment has a collar, such as a shirt or jacket, then the label is typically located on an interior surface of the collar. If, on the other hand, the garment has a waistline, such as a pair of trousers, then the label is typically located on an exterior surface of the waistline. The labels on the garments are then usually read by an operator and the identifying information is collected before each garment is placed on a conveyor. This is a tedious and time consuming procedure.

With known conveyors, the hangers are usually oriented substantially perpendicular to the axis of the conveyor. The labels on the garments therefore each typically face the garment located either immediately in front or behind the respective garment. It has not yet been possible to rotate either the hangers or the garments from one position into another relative to the conveyor while the garments are being conveyed, in order to view the labels.

SUMMARY OF THE INVENTION

The present invention is directed to an apparatus for conveying hooked members for supporting articles. The apparatus comprises a conveying member adapted to support and convey the hooked members. A positioning member is adapted to rotate each hooked member from a first position into a second position oriented at an angle relative to the first position upon conveyance by the conveying member.

In an apparatus of the present invention, the conveying member defines a helical surface adapted to receive the hooked members and to convey the hooked members toward one end of the conveying member upon rotation of the conveying member. The positioning member defines a positioning surface shaped to engage each hooked member upon conveyance by the conveying member. The positioning surface facilitates the rotation of each hooked member from the first position into the second position by contact therewith upon being conveyed by the conveying member. The positioning member further defines a slot extending therethrough and adapted to receive each hooked member. The slot maintains each hooked member in the second position upon being conveyed by the conveying member.

An apparatus of the present invention further comprises a shaft coupled to the conveying member, whereupon rotation of the shaft causes rotation of the conveying member. The shaft preferably includes, for example, a single helical groove adapted to receive the hooked members, and to convey the hooked members toward one end of the shaft upon rotation of the shaft. The apparatus preferably further comprises a helical coil having substantially the same pitch as the helical groove and coupled to the shaft adjacent to the helical groove. The helical coil is adapted to prevent the hooked members from being forced from the helical groove upon rotation of the shaft.

The present invention is also directed to a method for conveying hooked members supporting articles, comprising the steps of: conveying the hooked members on a conveyor in a first position; and rotating the hooked members from the first position into a second position oriented at an angle relative to the first position while the hooked members are being conveyed on the conveyor.

A method of the present invention further comprises the step of conveying each hooked member along a rotating helical surface in the first and second positions. The method preferably further comprises the step of conveying each hooked member into sliding contact with a positioning surface to rotate each hooked member from the first position into the second position.

One advantage of the apparatus and method of the present invention, is that because the hooked members are rotated from a first position into a second position upon being conveyed by the conveying member, the articles supported from the hooked members can be oriented in a position facilitating the reading of coded labels or other labels attached to the articles. Thus, the apparatus and method of the present invention can be employed to convey articles, such as garments, to a conveyor while simultaneously automatically reading coded labels or other types of labels attached to the garments.

Other advantages of the apparatus and method of the present invention will become apparent in view of the following detailed description and drawings taken in connection therewith.

DETAILED DESCRIPTION

Figure 1:
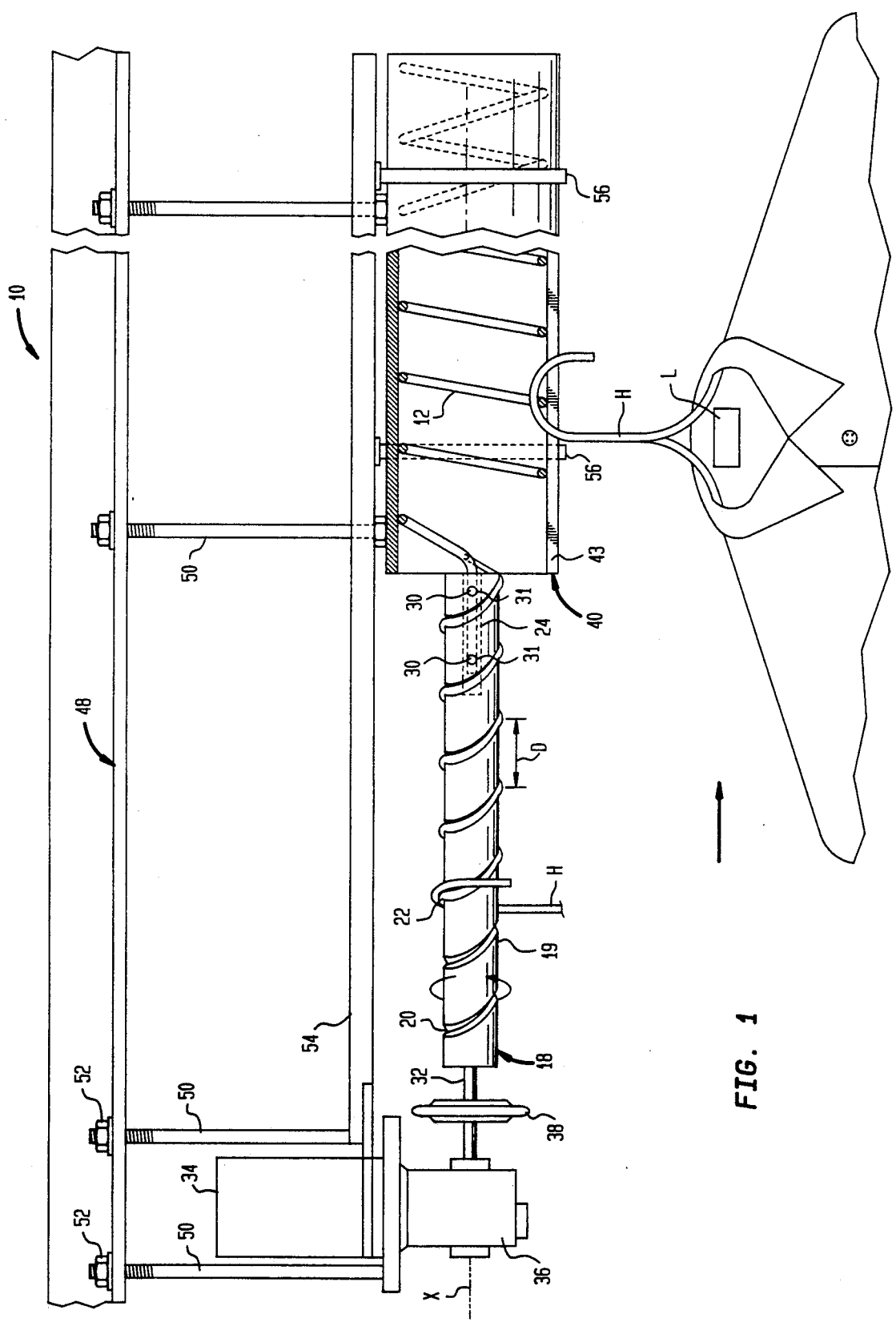
FIG. 1 is a front plan view of an apparatus embodying the present invention for conveying hooked members supporting articles.

In FIG. 1, an apparatus embodying the present invention for conveying hooked members for supporting articles, is indicated generally by the reference numeral 10. In the example illustrated, the apparatus 10 is used to convey garments supported on hangers H, typically in a laundry or dry cleaning facility. It should be pointed out, however, that the apparatus and method of the present invention are equally adapted for conveying any of numerous other types of hooked members and articles in other types of facilities.

Figure 2:
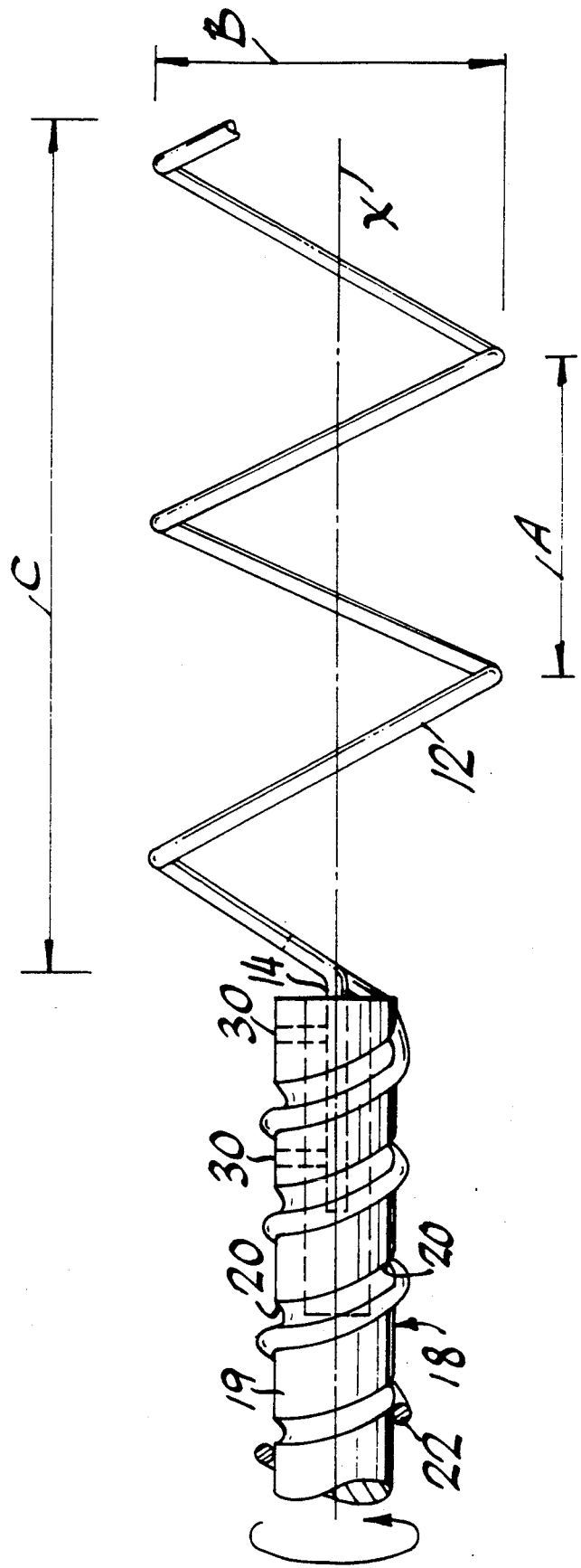
FIG. 2 is a partial, further detailed plan view of the helical member and conveying shaft of the apparatus of FIG. 1.

The apparatus 10 comprises a helical member 12, which is shown in further detail in FIG. 2. The helical member 12 is made by winding a hardened flexible steel wire, such as "music wire", into a generally helical shape. The helical member 12 defines a pitch A, an outside diameter B, a helical portion C (shown partially in FIG. 2), and a straight portion 14 on one end.

In order to facilitate the winding operation, the pitch A preferably does not exceed the diameter B. In the embodiment of the present invention illustrated, the wire is about ¼ of an inch in diameter, the pitch A is about 3.5 inches, the diameter B is also about 3.5 inches, and the length of the helical portion C is about 48 inches. As will be recognized by those skilled in the art, however, these dimensions are only exemplary, and can be changed as necessary to meet the space and conveying requirements of any conveying system. As shown in FIG. 2, the helical member 12 defines an axis of rotation X, and the axis of the straight portion 14 is substantially coincident with the axis X.

The apparatus 10 further comprises a conveying shaft 18 coupled on one end to the straight portion 14 of the helical member 12. The conveying shaft 18 defines a substantially cylindrical exterior surface 19, and a single helical groove 20 formed within the surface 19. The helical groove 20 defines a pitch D and extends substantially from one end of the conveying shaft 18 to the other. In the embodiment of the present invention illustrated, the pitch D is approximately 1.3 inches which, however, is purely exemplary, and can be changed as desired.

A helical coil 22, which also has a pitch D and, thus, is substantially the same as the pitch of the helical groove 20, is coupled to the shaft 18 immediately behind the helical groove, as shown in FIGS. 1 and 2. The helical coil 22 follows the helical groove 20 and extends beyond the end of the shaft 18 and is coupled on its free end to the helical member 12, as shown in FIG. 2. Although the helical member 12 and helical coil 22 are illustrated as separate components, they can equally be fabricated as integral components. For example, a single wire can be wound to form both the helical coil 22 and helical member 12. In this case, the helical member 12 would not include the straight portion 14.

When the hooked end of a hanger H is placed onto the rotating shaft 18, the rotation of the shaft causes it to fall into the helical groove 20, as shown in FIG. 1. The coil 22 in turn prevents the hanger H from slipping out of the groove 20. As the shaft 18 is rotated, the hanger H is moved along the length of the shaft within the groove 20, conveyed off the end of the shaft 18, and over the end of the helical coil 22 onto the helical member 12. The hanger H is then conveyed along the length of the helical member 12 upon rotation of the helical member, as is described further below.

Figure 3:
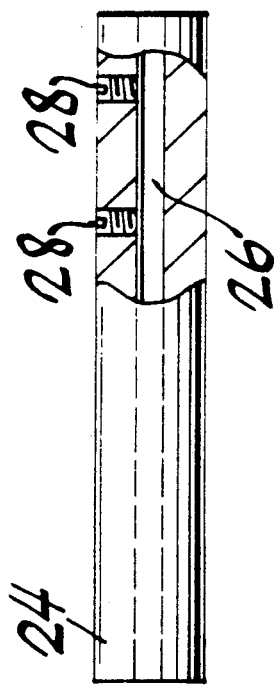
FIG. 3 is a partially cut-away, plan view of an adapter shaft of the apparatus of FIG. 1.

The apparatus 10 further comprises an adapter shaft 24 inserted in one end of the shaft 18, as illustrated in dashed lines in FIG. 1. As shown in FIG. 3, the adapter shaft 24 is substantially cylindrical, and includes an aperture 26 extending through the shaft in the axial direction. In the embodiment of the present invention illustrated, the diameter of the aperture 26 is equal to about ¼ of an inch, which, however, is purely exemplary. The aperture 26 is therefore adapted to receive the straight portion 14 of the helical member 12, as shown in FIGS. 1 and 2. The adapter shaft 24 further defines two threaded apertures extending between the outside surface of the shaft and the aperture 26, as illustrated in FIG. 3. The threaded apertures are adapted to receive set screws 28 to secure the straight portion 14 of the helical member 12 within the adapter shaft 24, as shown in FIGS. 1 and 2.

The shaft 18 also includes a pair of threaded apertures 30 extending through the cylindrical surface 19, as illustrated in dashed lines in FIG. 2. Each threaded aperture 30 is adapted to receive a set screw 31, as shown in FIG. 1. Thus, the adapter shaft 24 is secured within the end of the shaft 18 by the set screws 31, and the straight portion 14 is, in turn, secured to the adapter shaft 24 by the set screws 28.

As shown in FIG. 1, a drive shaft 32 is coupled to the end of the shaft 18. The other end of the drive shaft 32 is rotatably driven by a motor 34 through a gear reducer 36 and a clutch 38. In the embodiment of the present invention illustrated, the motor 34 is an AC drive motor which runs at approximately 1,725 rpm, and the gear reducer 36 provides a gear ratio of approximately 5:1. Therefore, the drive shaft 32 and, thus, the conveying shaft 18 and helical member 12 turn at approximately 345 rpm. Accordingly, if the hangers H loaded onto the apparatus 10 are spaced about 21 inches apart, the apparatus 10 should deliver the garments at a conveying speed of about 1 garment per second. As will be recognized by those skilled in the art, however, the type of motor 34, its speed of operation, and its gear ratio, along with the dimensions of the conveying shaft 18, helical coil 22 and helical member 12, can be changed to obtain any desired conveying speed.

Figure 4:
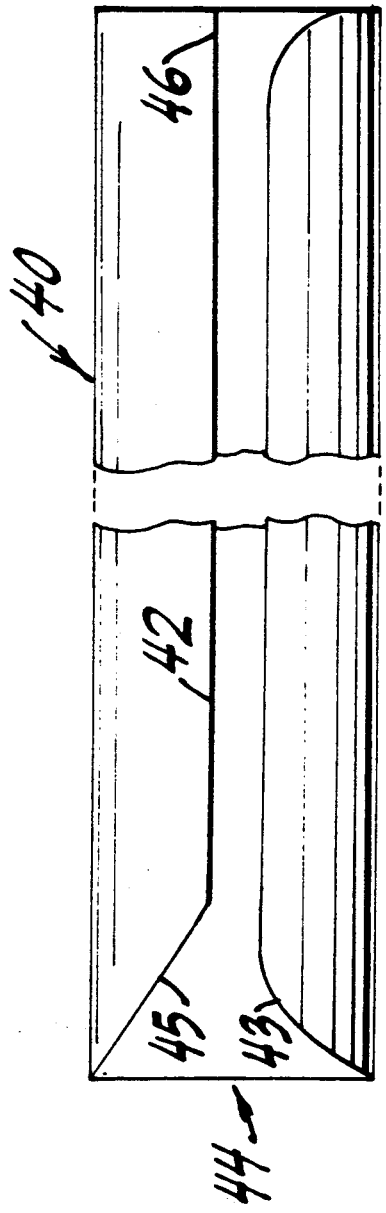
FIG. 4 is a bottom plan view of the support tube of the apparatus of FIG. 1.

The apparatus 10 further comprises a hollow support tube 40, which is adapted to receive the helical member 12, as shown in FIG. 1. The support tube 40 both supports the helical member 12 and substantially prevents someone, such as an operator, from bumping into or otherwise interfering with the operation of the helical member 12. The support tube 40 defines a slot 42 extending through the bottom portion substantially parallel with the axis X, as shown in FIG. 4. The width of the slot 42 is dimensioned to receive the hooked end and/or the neck portion of a hanger H to permit the hanger to slide through the slot, as shown in FIG. 1. The support tube 40 further defines an entrance portion 44 on one end of the slot 42 and an exit portion 46 on the other end of the slot, as shown in FIG. 4.

The entrance portion 44 is adapted to receive each hanger H as it is conveyed from the conveying shaft 18 onto the rotating helical member 12. The entrance portion 44 is shaped so that when the hooked end of a hanger H contacts the entrance portion, it causes the hanger H to rotate about 90° upon being conveyed therethrough. When the hangers H are supported within the helical groove 20 of the conveying shaft 18, each hanger H is oriented in a first position wherein the plane of each hanger is oriented at an angle relative to the axis X. As shown in FIG. 1, the angle is determined by the shape of the helical groove 20 and is nearly 90°. However, as the hangers H are conveyed onto the rotating helical member 12, they are rotated from the first position into a second position substantially parallel or in line with the axis X, as also shown in FIG. 1.

As shown in FIG. 4, the entrance portion 44 is defined by a first surface 43 and a second surface 45. Both the first and second surfaces 43 and 45, respectively, extend between the entrance end of the support tube 40 and a respective side of the slot 42. As shown in FIG. 4, the second surface 45 is located further away from the entrance end of the support tube 40 than is the first surface 43. The second surface 45 thus meets the slot 42 at a point further away from the entrance end than does the first surface 43. As each hanger H is conveyed forward into the entrance portion 44, the first surface 43 contacts the hanger H and, in turn, causes it to begin to rotate from the first position into the second position. For purposes of explanation, in the hanger H shown supported on the helical member 12 in FIG. 1, the back side of the hooked end is the left side when facing the drawing, and the front side of the hooked end is the right side when facing the drawing.

As the hanger H is conveyed forward by the rotating helical member 12, the back side of the hooked end of the hanger H slides against the first surface 43 and the front side of the hooked end is simultaneously rotated by the second surface 45 and into the slot 42. If the front side of the hooked end of the hanger H contacts the second surface 45, the shape of the second surface facilitates the insertion of the front side into the slot 42. Then, once the entire hooked end of the hanger H is located within the slot 42, the hanger is maintained in the second position substantially parallel to the axis X as it is conveyed through the slot 42 by the helical member 12. As shown in FIG. 4, the exit portion 46 defines a curved surface on one side of the slot 42 to facilitate the release of the hangers H from the helical member 12 and the support tube 40.

One advantage of the apparatus and method of the present invention, therefore, is that the position of the hangers H and, thus, the position of the garments supported on the hangers H can be controlled while being conveyed. Accordingly, if it is necessary to view, for example, a label located within the collar of a garment while the garment is being conveyed, such as the label L shown in FIG. 1, the label can easily be viewed from the side of the apparatus 10. In prior conveying systems, on the other hand, such a label would typically face the garment located immediately in front or behind the garment and, thus, could not easily be viewed while being conveyed.

As will be recognized by those skilled in the art, the exact dimensions of the first surface 43, the second surface 45, and the slot 42 will vary depending upon the dimensions of the other components of the apparatus 10. It will be well within the knowledge of those skilled in the art, however, to determine the exact dimensions necessary to cause the entrance portion 44 to rotate each hanger H from a first position into a second position while being conveyed.

The apparatus 10 is adapted to be coupled to a ceiling support 48 of a dry cleaning or laundry facility, as shown in FIG. 1. A plurality of threaded rods 50 are each coupled on one end to the ceiling support 48 by a respective fastener 52 and project downwardly from the ceiling support, as shown in FIG. 1. The other end of each threaded rod 50 is coupled to a support plate 54. As shown in FIG. 1, the motor 34 is mounted on one end of the support plate 54, and suspended on the other side from the ceiling support 48 by threaded rods 50. The support tube 40 is also supported from the support plate 54 by several brackets 56 spaced apart from each other in the axial direction of the support tube, as shown in FIG. 1. Each bracket 56 includes a gap (not shown) corresponding in position to the slot 42 to permit the hangers H to pass freely through the slot. It should be pointed out that the ceiling support 48 is purely exemplary, and the apparatus 10 can equally be mounted on another type of structure supported, for example, on a floor or wall.

In the operation of the apparatus and method of the present invention, the motor 34 is operated to rotatably drive the drive shaft 32 and, in turn, the conveying shaft 18 and helical member 12. The hooked ends of the hangers H are placed within the helical groove 20 of the conveying shaft 18. As the conveying shaft 18 is rotated, the hangers H are moved forward in the direction of the arrow in FIG. 1, and the helical groove 20 and helical coil 22 cause each hanger H to be maintained in the first position, as shown in FIG. 1.

Then, when each hanger H reaches the end of the shaft 18, it slides over the end of the helical coil 22 and onto the rotating helical member 12. While the hangers H are conveyed through the entrance portion 44 of the tube 40, the hooked end of each hanger H contacts and, thus, is driven by the helical member 12 against the first surface 43. The shape of the first surface 43 causes each hanger H to be rotated approximately 90° from the first position into the second position, as shown in FIG. 1. As can be seen, both the front and back sides of the hooked end of each hanger H extend through the slot 42 and, thus, each respective hanger H is maintained in the second position while being conveyed through the slot 42. Once each hanger H reaches the end of the support tube 40, the hangers H are then released from the helical member 12 and through the exit portion 46 onto, for example, another conveyor or receiving rail (not shown).

One advantage of the apparatus and method of the present invention, is that if a shirt, for example, is placed on a hanger H, a label L attached to the inside portion of the collar can be viewed when the hanger H is conveyed through the slot 42 of the tube 40, as shown in FIG. 1. Likewise, if a pair of trousers or similar type of garment (not shown) is placed on a hanger H, a label L attached to the waistline of the garment can be viewed when the garment is conveyed through the slot 42 of the tube 40. Accordingly, because the garments are rotated from a first position into a second position, the labels attached to the garments can be rapidly and reliably read upon being conveyed on the apparatus 10.

The apparatus and method of the present invention is therefore particularly suited for conveying garments with coded labels attached to the garments. A scanning device (not shown) can be located on one side of the apparatus 10 and oriented so that when the hangers H are conveyed along the helical member 12, the scanning device can read the identifying information on each respective coded label. The identifying information can, in turn, be transmitted to a computer control system (not shown) for subsequently sorting the garments on, for example, a sorting conveyor. Preferably, if the garment is a shirt or jacket, the coded label is located on the inside surface of the collar. If, on the other hand, the garment is a pair of trousers, the coded label is preferably located on an outside surface on the waistline. In this way, when the hangers H are oriented in the second position on the helical member 12, as shown in FIG. I, the coded labels on the garments can be quickly and reliably read by a scanning device.

As will also be recognized by those skilled in the art, the apparatus and method of the present invention can be readily adapted for conveying any of numerous types of hooked members supporting articles, and for rotating the hooked members and articles from one position into another while being conveyed.

We claim:

1. An apparatus for conveying hooked members for supporting articles, comprising:
    a conveying member adapted to support and convey the hooked members; and
    a positioning member adapted to rotate each hooked member from a first position into a second position oriented at an angle relative to the first position upon conveyance by the conveying member, wherein the positioning member defines a slot extending therethrough and adapted to receive each hooked member and to maintain each hooked member in the second position upon being conveyed therethrough by the conveying member.

2. An apparatus as defined in claim 1, wherein the positioning member further defines a second surface located on an opposite side of the slot relative to the first surface, the second surface being shaped to facilitate the rotation of each hooked member from the first position for insertion into the slot in the second position upon being conveyed by the conveying member.

3. An apparatus for conveying articles supported on hooked members, comprising:
    a rotatably mounted conveying member adapted to convey the hooked members upon rotation thereof; and
    means for rotating each hooked member from a first position into a second position oriented at an angle relative to the first position; and
    a positioning surface supported adjacent to the conveying member for contacting and maintaining the hooked members in the second position during conveyance of the hooked members along at least a portion of the conveying member.

4. An apparatus as defined in claim 3, further comprising:
    a support member adapted to support the conveying member, wherein the means for rotating includes an entrance portion within the support member and shaped to rotate each hooked member from the first position into the second position upon the hooked member being conveyed therethrough by the conveying member.

5. An apparatus as defined in claim 4, wherein the positioning surface defines a slot formed through the support member and extending from the entrance portion in a direction substantially parallel to the conveying member, the slot being adapted to receive each hooked member upon being rotated into the second position, and to maintain each hooked member in the second position upon being conveyed through the slot by the conveying member.

6. An apparatus as defined in claim 3, further comprising:
    a rotatably mounted conveying shaft coupled to the conveying member to receive the hooked members in the first position, whereupon rotation of the conveying shaft causes rotation of the conveying member.

7. An apparatus as defined in claim 6, wherein the conveying shaft includes a helical groove adapted to receive the hooked members and to convey the hooked members upon rotation of the conveying shaft.

8. An apparatus as defined in claim 7, further comprising:
    a helical coil having substantially the same pitch as the helical groove and coupled to the conveying shaft adjacent to the helical groove, the helical coil being adapted to prevent the hooked members from being forced from the helical groove upon rotation of the conveying shaft.

9. An apparatus as defined in claim 3, wherein each hooked member is a hanger, and in the first position, each hanger is oriented at an angle relative to an axis of the conveying member, and in the second position, each hanger is oriented substantially parallel to the axis of the conveying member.

10. An apparatus as defined in claim 3, wherein the conveying member is a rotatably mounted helical member.

11. An apparatus for conveying articles supported on hooked members, comprising:
    a conveying member adapted to support the hooked members;
    first means for rotating the conveying member to convey the hooked members supported on the conveying member; and
    second means for rotating each hooked member from a first position into a second position and including a positioning surface for contacting and maintaining the hooked members in the second position for conveyance by the conveying member in the second position along at least a portion of length of the conveying member.

12. An apparatus as defined in claim 11, further comprising:
    a helical member having substantially the same pitch as the helical groove and coupled to the shaft adjacent to the helical groove, the helical member being adapted to prevent the hooked member the hooked members from being forced from being forced from the helical groove upon rotation of the shaft.

13. An apparatus as defined in claim 11, wherein each hooked member is a hanger, and in the first position, each hanger is oriented at an angle relative to an axis of the conveying member, and in the second position, each hanger is oriented substantially parallel to the axis of the conveying member.

14. An apparatus as defined in claim 11, wherein the conveying member is a helical member.

15. An apparatus for conveying articles supported on hooked members, comprising:
 a helical member adapted to support the hooked members;
 first means for rotating the helical member to convey the hooked members supported on the helical member, wherein the first means includes a rotatably supported shaft coupled on one end to the helical member and including a helical groove adapted to receive the hooked members, whereupon rotation of the shaft, the hooked members are conveyed within the helical groove and, in turn, onto the helical
 second means for rotation each hooked member from a first position into a second position for conveyance by the helical member in the second position.

16. An apparatus as defined in claim 15, wherein the first means further includes a helical coil coupled to the shaft and located adjacent to the helical groove, the helical coil being adapted to prevent the hooked members from being released from the helical groove upon rotation of the shaft.

17. An apparatus for conveying articles supported on hooked members, comprising:
 a helical member adapted to support the hooked members;
 first means for rotating the helical member to convey the hooked members supported on the helical member; and
 second means for rotating each hooked member from a first position into a second position for conveyance by the helical member in the second position wherein the second means includes a support tube to receive the helical member and defining an entrance portion shaped to rotate each hooked member from the first position into the second position, upon being conveyed therethrough by the helical member.

18. An apparatus as defined in claim 17, wherein the support tube includes a slot formed therethrough and extending from the entrance portion in a direction substantially parallel to the helical member, the slot being adapted to receive the hooked members and to maintain the hooked members in the second position upon conveyance therethrough by the helical member.

19. A method for conveying hooked member supporting articles, comprising the steps of:
 conveying the hooked members on a conveyor in a first position, wherein the conveyor includes a rotatably mounted conveying member adapted to convey the hooked members upon rotation thereof; and
 rotating the hooked members from the first position into a second position oriented at an angle relative to the first position while the hooked members are being conveyed on the conveyor and maintaining the hooked members in the second position while being conveyed by the conveyor along at least a portion of the length of the conveyor, wherein the hooked members are rotated into and maintained in the second position during conveyance of the hooked members along at least a portion of the conveying member by means of a positioning surface supported adjacent to the conveying member.

20. A method as defined in claim 19, wherein each hooked member is a hanger is oriented at an angle position, each hanger is oriented at an angle relative to the axis of the conveyor, and in the second position, each hanger is oriented substantially parallel to the axis of the conveyor.

21. A method as defined in claim 19, further comprising the step of:
 conveying each hooked member along a rotating helical surface in the first and second positions.

22. A method as defined in claim 21, further comprising the step of:
 conveying each hooked member into sliding contact with a positioning surface to rotate each hooked member from the first position into the second position.

23. An apparatus for conveying hooked members for supporting articles of clothing, comprising:
 a rotatably mounted helical member for supporting and conveying the hooked members upon rotation thereof; and
 a positioning member supported adjacent to the helical member for rotating each hooked member relative to an axis of the helical member from a first position into a scanning position while being conveyed by the helical member and to maintain each hooked member and, thus, an article of clothing supported thereon in the scanning position while being conveyed by the helical member along at least a portion of the length of the helical member for permitting an identifying member on each article of clothing to be scanned while being conveyed.

24. An apparatus as defined in claim 23, wherein the positioning member defines a tubular portion for receiving the helical member.

25. An apparatus as defined in claim 24, wherein the tubular portion defines a slot adapted to permit the hooked members to pass therethrough and to maintain the hooked members in the scanning position while being conveyed.

* * * * *